United States Patent Office 3,167,162
Patented Jan. 26, 1965

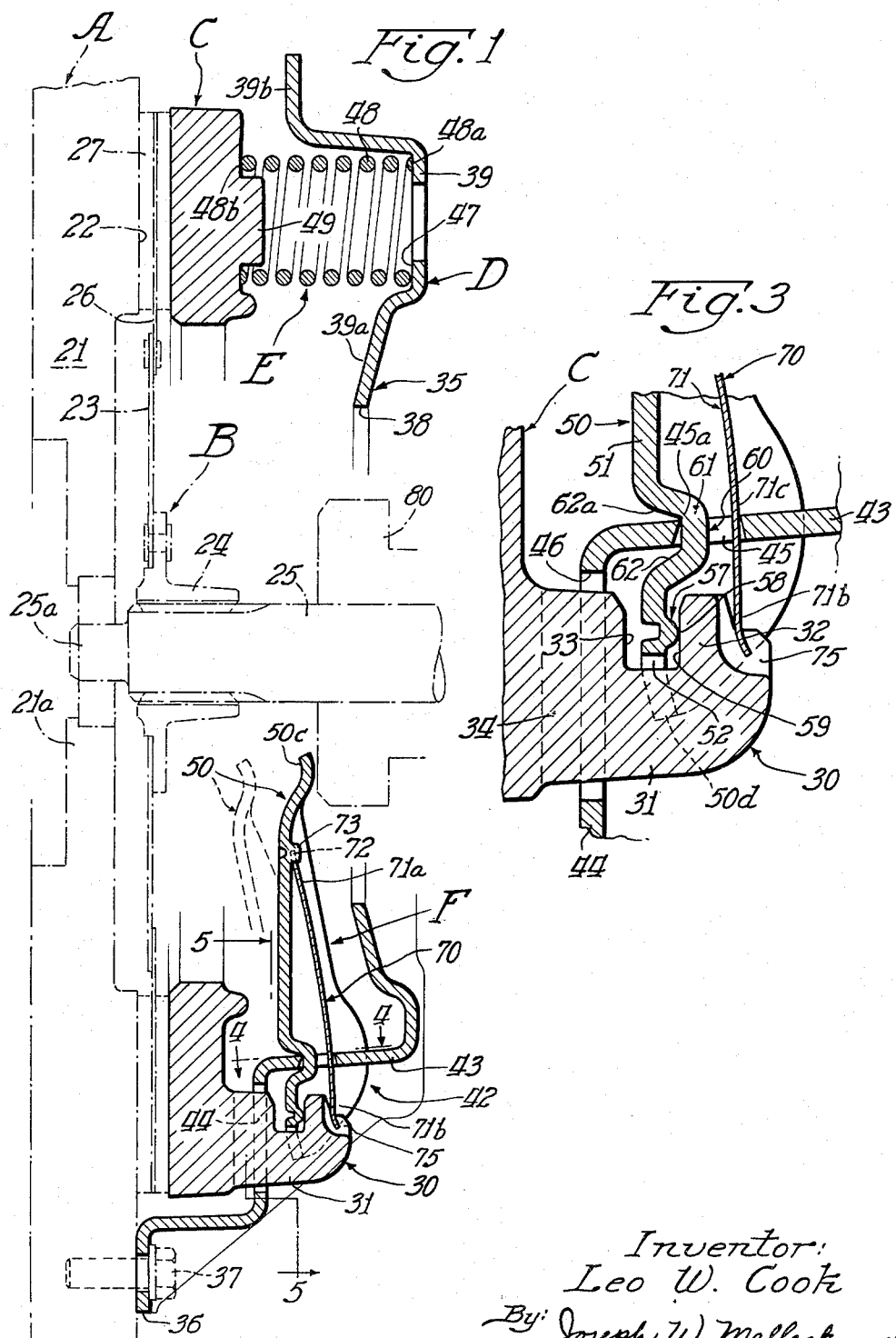

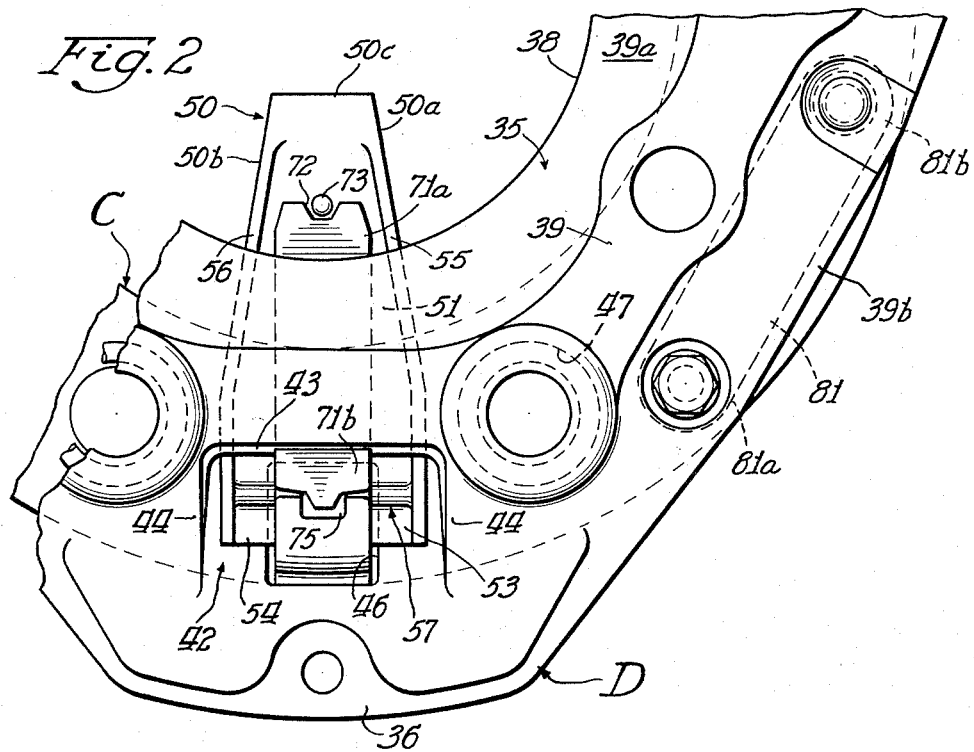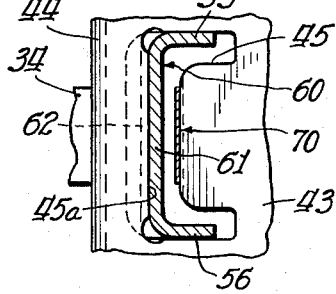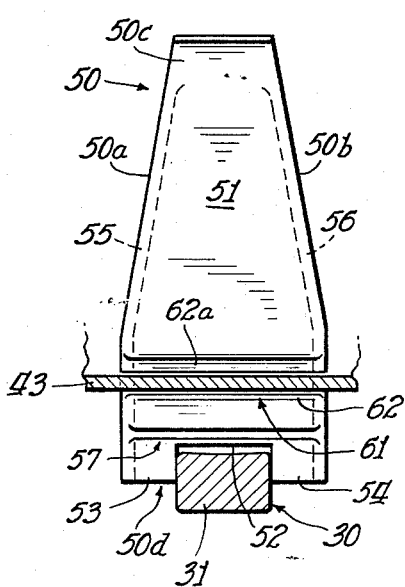

3,167,162
CLUTCH DEVICE
Leo W. Cook, Chicago, Ill., assignor to Borg-Warner Corporation, Chicago, Ill., a corporation of Illinois
Filed Jan. 2, 1962, Ser. No. 163,454
6 Claims. (Cl. 192—68)

This invention relates to friction devices and more particularly to operating mechanisms used to disengage clutch devices in installations commonly employed in motor vehicles or the like.

Considerable effort has been expended to devise more simple and economical clutch devices which also provide improved operating characteristics. Particular constructions, which are pertinent to this invention and which evidence the latest economy features, are disclosed in Patents 2,895,581 and 2,920,731 and pending application U.S. SN 30,278, now Patent No. 3,090,475 (all are assigned to the assignee herein). Accordingly, this invention is directed to improvements over such references.

The above references are particularly concerned with a clutch device characterized by the combination of a generally dish-like cover plate having its periphery secured to a flywheel drivingly connected to the engine drive shaft; there is a pressure plate biased toward the flywheel by coil springs acting between the cover plate and the pressure plate and a driven plate is normally clamped between the pressure plate and the flywheel for imparting drive. The pressure plate has a plurality of circumferentially spaced lugs projecting through registering openings provided in the cover plate to afford driving of the pressure plate; release of the pressure plate from the driven plate is afforded by a plurality of circumferentially spaced radially arranged release levers adapted to interconnect with the lugs. Each of these release levers customarily are stamped out of sheet metal and normally pass through other openings provided in a peripheral or offset wall in the cover plate, the wall being substantially perpendicular to the plane of the pressure plate. The levers fulcrum on an edge defining in part the opening in the offset wall while an outer end of the lever is positively engaged with a pressure plate lug; upon movement in one direction of the inner ends of the levers by a release bearing or the like, the clutch will be disengaged.

In the above references, great interest has been shown in the development of the lever construction with the intention of providing a more durable arrangement which would be subject to less wear while maintaining economy and compactness necessitated in modern vehicles.

One disadvantage of known levers used in the above clutch devices is the type of construction on the lever which is employed to engage other parts of the device for restraining the levers against outward movement due to centrifugal forces while in operation. One example of such restraining construction is the formation of transversely extending shoulders which are normally interrupted so that the bearing area of the shoulders will not extend substantially across the entire transverse dimension of the lever. In some constructions the shoulders take the form of wings extending outwardly from either side of the lever. Such interruption prevents localized stresses from being more uniformly distributed than is possible by this invention. In addition, the accompanying portions of the device adapted to interengage the separated shoulders for restraining the lever in outward movement have usually been provided independently of means adapted to act as a fulcrum for the lever; this can now be provided by one and the same segment according to this invention.

Pursuant to the above disadvantages, it is contemplated by this invention that the lever construction be more simply and economically constructed by having a continuous recess extending transversely across the lever and which recess carries a cylindrical surface adapted not only to engage a knife-edge of the cover plate for fulcruming the levers but also to engage the knife-edge in a manner to restrain each lever against movement due to centrifugal forces. This affords the dual advantages of permitting the lever to have a longer life span and reduces the cost of manufacture.

Another disadvantage of the release means as illustrated in the above references and in the prior art, is the inability of known lever retention springs to function so that they will not counteract the effect of the larger clutch engaging springs. The counteraction results from the lever retention springs which place a slight load on the levers to maintain them in operative engagement and thereby transmit a disengaging force to the pressure plate. A particular feature of this invention is to obviate this condition by providing lever retention springs which are isolated from affecting the larger clutch engaging springs and which are adapted to neutrally shift with the levers as they are operatively moved.

Therefore, it is a principal object of this invention to provide an improved clutch device of simple, inexpensive and light weight construction and having a high degree of efficiency in operation.

Similarly in the broad aspects of this invention, another object is to provide a novel combination of elements including a clutch cover plate having fulcrum portions for a plurality of clutch release levers adapted for actuating a clutch pressure plate, the pressure plate having driving lugs extending in an axial direction through openings in the cover plate and interconnecting with the levers, the levers being particularly characterized by a recess provided transversely therein of each lever to receive the fulcrum portion formed on the cover plate, the recess being adapted to more uniformly distribute stress of interengagement with the pressure plate and to more adequately distribute stress of interengagement for restraining the levers against outward movement.

Another object of this invention is to provide an improved clutch device of the type utilizing a plurality of clutch releasing levers operatively interengaging a pressure plate and cover plate, and in which a plurality of lever retention springs are employed to hold the levers in said operative relationship, the springs being particularly characterized in that they are adapted to operate without affecting or counteracting the operation of the clutch engaging means.

Still another object of the present invention is to provide a clutch in accordance with the preceding objects and in which the lever retention springs are formed as flat leaf springs arranged to operate in beam-like fashion whereby the spring ends are respectively connected one to the lever and an opposite one to the pressure plate on the opposite side of the lever pivot and with an intermediate portion of each spring adapted for bearing against the cover plate; the spring ends are adapted to laterally shift in accordance with the pivoting of the levers and while still urging the levers into proper relation with the pressure plate and cover plate.

This invention consists of the novel constructions, arrangements and devices to be hereinafter described and claimed in carrying out the above stated objects and such other objects as will be apparent in the following description of a preferred form of the invention, illustrated with reference to the accompanying drawings, wherein:

FIGURE 1 is a central sectional view of a clutch assembly embodying the principles of the present invention, the view being taken substantially along line 1—1 of FIGURE 2 and showing, in broken outline, another operative position of the clutch levers;

FIGURE 2 is a fragmentary side view, partially broken away, of the clutch assembly shown in FIGURE 1 and looking at the clutch from the right;

FIGURE 3 is an enlarged fragmentary sectional view of portions of the lever, pressure plate lugs and cover plate;

FIGURE 4 is a fragmentary sectional view taken substantially along line 4—4 of FIGURE 1; and FIGURE 5 is an enlarged fragmentary sectional view taken substantially along line 5—5 of FIGURE 1.

The drawings are to be understood as being more or less of a schematic character for the purpose of disclosing a typical or preferred form of the improvements contemplated herein, and in these drawings like reference characters indicate the same parts in the several views.

Referring to the drawings, and more particularly to FIGURES 1 and 2, the clutch assembly broadly comprises a driving means A, a driven means B, a pressure plate means C, a cover plate D secured to the driving means and adapted to surround the pressure plate and driven means, resilient means E normally urging the pressure plate into engagement with the driven means, and release means F adapted to overcome the effect of the resilient means to provide clutch disengagement.

The driving means A more particularly comprises a flywheel 21 having a clutching face 22 and is drivingly connected to an engine shaft (not shown); the driven means B more particularly comprises a clutch disc 23 of conventional construction having a central hub 24 splined to an output shaft 25 with one end 25a of the shaft journaled in a central portion 21a of the flywheel. The clutch disc 23 has a plurality of resilient backing plates 26 fastened to the outer periphery of the disc and each plate carries oppositely facing friction facing elements 27.

The pressure plate C, more particularly, is provided with an annular configuration and has a plurality of circumferentially spaced lugs 30 near the outer periphery thereof; each lug is formed with an axially extending portion 31 and a radially inwardly extending portion 32 and which portions together define a slot 33 in cooperation with a base portion 34 of the pressure plate lug.

The cover plate D is preferably of a heavy sheet metal stamping comprising a body portion 35 of generally dish-shaped silhouette and having offset and outwardly flared circumferentially spaced attaching portions or feet 36 secured to the outer periphery of the flywheel 21 by suitable fasteners 37. The body portion of the cover plate has a central circular opening 38 of sufficient size to provide clearance for the driven shaft 25 and other instrumentalities of the clutch mechanism. The body portion of the cover plate is generally of a semitriangular form in plan view (see FIGURE 2) having channels 39 forming the legs of the triangular configuration; each channel opens toward the pressure plate and has lips 39a and 39b extending along and generally radially from the margins of the channel (in referring to radial and axial directions herein, such directions shall be understood to mean relative to the central rotative axis of the clutch device). At each intersection of the channels is formed a recessed station 42 comprising in part two walls 43 and 44 generally perpendicular to each other; wall 43 extends generally in an axial direction of the clutch device and wall 44 extends generally in a radial direction thereof. As shown in FIGURE 3, wall 43 is provided with a rectangular opening or slot 45 having one longitudinal edge 45a thereof adapted to serve as a knife-edge fulcrum for purposes hereafter described. Wall 44 also is provided with an opening 46 through which extend one of the lugs 30. Certain of the side edges of the openings 46 engage the lugs to transmit drive from the cover plate to the pressure plate while allowing axial movement of the pressure plate.

The channels 39 are shaped to provide circular seats 47 spaced circumferentially about the cover plate and are adapted to journal clutch engaging springs 48 which comprise the resilient clutch engaging means E. The springs 48 may be of the coil compression type having one end 48a bearing against one of the seats 47 and an opposite end 48b bearing against the pressure plate for normally urging and holding the pressure plate in engagement with the driven plate. Bosses 49 are provided on the outer face of the pressure plate; each boss is adapted to journal one end 48b of one of the springs.

Turning now to the clutch release means F, it comprises a plurality of radially extending and circumferentially spaced levers 50 adapted to pivot or fulcrum about portions of the cover plate and urge the plate out of engagement with the driven means B. Experience has shown that the manner of construction of bearing surfaces on the levers and how the surfaces are adapted to mate with accompanying parts is very critical not only to the operating life of a clutch device but also to the cost of fabrication.

Each lever 50 is formed from a single ply of suitable material, such as durable sheet metal, and has a plan shape (see FIGURE 2) including a flat web 51 which is generally rectangular except for a slight partial taper of the side edges 50a and 50b toward the inner end 50c of each lever; there is also a notch 52 provided in the outer end 50d of each lever. The notch 52 in effect bifurcates the end 50d so that there is a pair of spaced wings 53 and 54. Integral portions of each lever located along the edges 50a and 50b thereof are flared outwardly to form respective flanges 55 and 56; the flanges extend generally in a direction normal to the plane of the lever web 51 and serve to strengthen the construction of the lever.

The inner end 50c is adapted to be engaged by suitable actuating mechanism, such as a thrust collar 80, so as to impart a force to the levers for pivoting them in a manner to provide clutch disengagement (to the left in FIGURE 1). The outer end 50d is adapted to extend into the slot 33 with wings 53 and 54 of the lever disposed on opposite sides of the axially extending portion 31 of the pressure plate lugs 30. Rotative drive is imparted to the pressure plate by a plurality of chordally disposed straps 81 each having one end 81a connected to the pressure plate and an opposite end 81b connected to the cover plate D.

Each lever has a transversely extending recess or bearing portion 57 formed adjacent the radially inner side of the notch 52 and has a cylindrical surface 58 carried by said recess; the surface 58 is adapted to engage a flat surface 59 formed as one side of the radially inwardly extending portion 32 of each lug 30. The recess or bearing portion 57 extends substantially throughout the entire width of each lever.

An intermediate portion 60 of each of the levers is provided with a transversely extending hollow rib 61 formed by indenting or recessing the ply of metal outwardly in a direction away from the pressure plate. Each rib 61 has an inner concave surface 62 which extends substantially throughout the entire width of the web 51 of each lever. Concave surface 62 may be formed in a circular cylindrical shape or may preferably, as shown in FIGURE 1, have a generally rectangular cylindrical shape whereby one of the sides 62a cooperates to form an integral shoulder which is adapted to engage the cover plate and restrain the lever against outward movement due to centrifugal forces during clutch operation. It is of particular significance to note that the shoulder 62a extends substantially throughout the entire width of the lever and may be conveniently and inexpensively provided in the process of fabricating the rib 61.

The concave surface 62 is adapted to interengage the straight knife-edge 45a constituting one edge of the opening 45 provided in the axially extending wall 43 of the cover plate. Each knife-edge 45a and rib 61 cooperate to provide a fulcrum about which one of the levers may pivotally operate. The opening 45 is of sufficient size to accommodate the offset dimension of the rib 61 and/or the recess 57 so that the levers may be withdrawn from the opening and disassembled.

The greatly increased bearing surface exhibited by the transversely extending surfaces 62 and the knife-edge 45a for providing the lever fulcrum provides far superior operation than that known in the prior art. The stress due to interengagement of such surfaces is more uniformly distributed across the contacting areas thereof for reducing localized stress and thereby increasing the smooth operating life of the clutch actuating mechanism. The surface 62 and knife-edge 45a at the same time provide a more durable restraining construction for each of the levers to inhibit outward movement due to centrifugal forces.

As shown in FIGURE 1, each of the levers is also provided with a resilient retention means 70 adapted to urge the levers into operative relationship with the pressure plate lugs and the fulcruming edge 45a of the cover plate. Heretofore, retention means have been constructed in a manner so that in assembled relation, the means would always have some effect upon the resiliency of the much larger and independent clutch engaging means E, the latter means usually being in the form of coiled compression springs 48 as shown in the preferred embodiment. Since the retention means of the prior art always worked through one contact to urge the release levers against the pressure plate and in a clutch disengaging direction, there would be a slight counteraction of the normally clutch engaging springs. Such counteracting effect would reduce the effectiveness of the clutch engaging means and, therefore, prevent reductions in spring size.

The retention means 70 of this invention comprises a plurality of resilient and flexible spring metal strips 71 with one strip each mounted on each lever. The strips 71 are disposed in a generally radial direction and have their longitudinal extent generally aligned with the longest extent of the lever. The inner end 71a of each strip is secured to a radially inner portion of the lever 50 and may be secured by being inserted within a pocket 72 formed by the lever and an outwardly extending finger 73 projecting from the web 51. Similarly the other end 71b of each strip is secured to a portion of one of the lugs on the pressure plate and may be secured by being received in a pocket 75 similarly formed thereon. An intermediate portion 71c of each strip is bowed outwardly in a direction away from the lever by spacing the pockets 72 and 75 a distance apart which is less than the length of the strip. The intermediate bowed portion 71c is adapted to engage a side of the opening 45 formed in the cover plate (the side being opposite the straight edge 45a) and such contact being generally axially aligned with the fulcrum of each lever. Such arrangement thereby permits the spring strips 71 to pivot about the intermediate bowed portion in sympathy with the pivoting of the levers 50. Therefore, a shift in the position of the levers will not affect the force with which the spring strips apply to retain the levers in engagement with the pressure plate lugs 30.

Each resilient strip 71 is adapted to operate so as not to apply any appreciable force to the pressure plate which would counteract the normal effect of the larger springs 48. This is brought about by having the total resilient retention force of each strip distributed to the lever 50 and lug 30 combination at both opposite sides of the lever fulcrum. The strips in effect act as "beams" wherein the beam fulcrum is analogous to the bowed intermediate portion of each strip in contact with the cover plate and which fulcrum receives a reaction force acting in a direction to the left. The ends of each strip may be considered points at which reaction loads from the lever and pressure plate lugs are applied and in a direction opposite to the reaction force of the cover plate. Since the pressure plate lug engages the outer end 50d of a lever, the reaction loads are effectively received from opposite ends of the levers which tend to balance each other out. Therefore, little resultant forces are transferred to the pressure plate to counteract the effect of the larger springs 48. The slight resultant force which may be produced due to the differential lever arms, since the fulcrum of both the lever and strip is spaced unequally from the ends thereof, is negligible.

In operation, the clutch device is engaged by permitting the springs 48 to assert their resiliency and urge the pressure plate C into engagement with the driven plate B and thereby promote conjoint rotation of the driven disc B and the driving flywheel A. To disengage the clutch device, a releasing force may be applied to the inner ends 50c of the levers 50 by way of a clutch releasing collar or the like. Such force should be applied in a direction to the left as indicated by the arrow in FIGURE 1. The levers 50 are caused to pivot in a counterclockwise manner about the fulcrum comprised of the knife-edge 45a of the cover plate opening 45 and the concave surface 62 carried by the rib 61 of the lever. At the same time the outer end 50d of each lever is moved to the right while in engagement with the surface 59 of the pressure plate lug 30. The pressure plate C is in turn moved axially to the right and withdrawn from engagement with the driven plate B.

During all movements or positions of the levers, the resilient retention strips 71 continuously interconnect the levers, pressure plate lugs 30 and the cover plate for maintaining them in an operative relationship. The strips, although applying no appreciable turning force to urge the levers in a counterclockwise direction, do present a flexible retaining means which prevent the levers from moving out of engagement with the corresponding fulcrum on the cover plate and also out of engagement with the pressure plate lugs. The resilient strips 71 act in a "beam-like" fashion to shift with the levers during pivoting and thereby isolate the strip 71 from influencing the normal resilient action of the clutch engaging springs 48.

While a certain preferred embodiment of the present invention has been specifically disclosed, it is understood that the invention is not limited thereto, as many variations will be readily apparent to those skilled in the art and the invention is to be given its broadest possible interpretation, within the terms of the following claims.

I claim:

1. A friction device, comprising: rotatable drive means; driven means; a pressure plate adapted to be urged toward said drive means for clamping said rotatable driven means therebetween to provide conjoint rotation thereof; a cover plate adjacent said pressure plate and fastened to said rotatable drive means for rotation therewith; resilient means normally urging said pressure plate toward said drive means for providing said conjoint rotation; and release means adapted to overcome the effect of said resilient means, said cover plate having a plurality of openings provided therein with at least one side of each of said opening comprising a straight knife-edge fulcrum, said release means comprising a plurality of levers, each having one end adapted for reception of a force to interrupt conjoint rotation and another end adapted to interengage said pressure plate in a manner for moving said pressure plate away from said drive means, said clutch device being particularly characterized by each of said levers having an intermediate portion provided with a recess having a cylindrical surface adapted to engage said knife-edge fulcrum and about which each of said levers may pivot, each said lever recess further having a shoulder adapted to engage said cover plate for restraining said levers against outward movement due to centrifugal forces during operation, said shoulder and cylindrical surface carried by each of said recesses being further characterized in that they extend across the entire transverse extent of each of said levers whereby stresses due to interengagement with said cover plate may be more uniformly distributed for reducing wear.

2. In a clutch device having a rotary cover plate having openings defined therein in part by spaced first and second edges, a pressure plate drivingly associated therewith a plurality of clutch release levers each extending through one of said openings provided in said clutch cover plate and each adapted to be fulcrumed about a first edge thereof, the levers being adapted to apply a disengaging force to an axially movable pressure plate, comprising: a plurality of resilient flat elongated retention strips each cooperating with one of said levers and extending through one of said cover plate openings in a manner to bear said second edge, each strip having one end thereof in engagement with one of said levers at one side of the lever fulcrum and having another end of said strip in engagement with a portion of said pressure plate in engagement with said lever at an opposite side of the lever fulcrum, each said strip having an intermediate flexed portion in engagement with said second edge of said cover plate, said second edge tending to flatten out said strip for urging the strip ends respectively against said lever and pressure plate portion to maintain the levers in assembled relation with said first edge of said cover plate.

3. A clutch device, comprising: annular rotatable drive means, annular rotatable driven means, an annular pressure plate adapted to be urged toward said drive means for clamping said driven means therebetween and providing conjoint rotation, a cover plate drivingly connected to said drive means and disposed adjacent said pressure plate, resilient means normally urging said pressure plate toward said drive means for providing said conjoint rotation, and release means disposed between said cover and pressure plate and comprising a plurality of circumferentially arranged levers, each lever having one end adapted to receive a force for disengaging said pressure plate and an opposite end interconnected with said pressure plate to impart an axial thrust thereto, each lever having an intermediate portion interengaged with said cover plate about which the lever pivots, said release means being particularly characterized by flexible strips each adapted to maintain one of said levers in operative relation with said pressure plate and cover plate while placing no resultant force on said lever to affect said resilient means, said resilient strips each having one end connected to the innermost end of said one lever and an opposite end connected to said pressure plate, said resilient strips further being characterized by an intermediate portion contacting said cover at an area generally aligned in an axially parallel direction with the fulcrum of the lever, each said strip having opposite ends interconnected with said one lever sufficient so that upon pivoting of said levers each said flexible strip shifts therewith in a manner to constantly resiliently urge said lever into operative relation with said cover plate and pressure plate without counteracting the effect of said resilient means normally urging said pressure plate into engagement with driven means.

4. In a clutch device as in claim 3, in which said resilient strip is substantially uniform in width throughout the length thereof and in thickness and has a generally thin configuration, said lever having an extension adapted to receive said one strip end of said strip in a manner to prevent relative movement axially and inwardly, and said pressure plate having an extension adapted to form a pocket to restrain said other end of the strip both axially and in an outward direction.

5. In a clutch device substantially as described in claim 3, in which said resilient strip is preformed in a normally bowed unflexed condition and adapted to be moved toward a generally flat condition when flexed and assembled with said lever and pressure plate.

6. In a clutch, an actuating assembly comprising: a rotary cover plate having at least one portion disposed generally transverse to the plane of rotation of said cover plate; a pressure plate drivingly associated with said cover plate; resilient means disposed between said pressure plate and cover plate normally urging said pressure plate for clutch engagement; a plurality of clutch release levers fulcrumed about a first edge of said cover plate's transverse portion and being effective to apply a disengaging force to said pressure plate overcoming said resilient means; and a plurality of resilient flat elongated thin strips having the longitudinal extent thereof extending generally adjacent and parallel to the extent of one of said levers, each strip being disposed adjacent each lever at a side opposite from the side of the lever most adjacent to the pressure plate, each strip being supportably interconnected with one of said levers and constrained at opposite ends thereof forming a slight bow in a direction normal to the plane of the strip, with one end connected to a portion of the lever disposed radially inwardly of the lever fulcrum and the other strip end interconnected to a portion of the levers at a side radially outwardly of the lever fulcrum, each said strip being slightly flexed from a flat condition by having said connected ends spaced apart a distance less than the length of each strip, each said strip having an intermediate portion in engagement with said cover plate at an area generally axially aligned with the fulcrum of said lever, each said strip intermediate portion receiving a reaction force from said cover plate opposite in direction to the reaction forces received from said lever at the strip ends, said strip being adapted to shift with the pivoting of the lever so as to constantly resiliently urge said lever and pressure plate and cover plate into operative relation without counteracting the effect of said resilient means.

References Cited in the file of this patent

UNITED STATES PATENTS

| | | |
|---|---|---|
| 2,405,357 | Jarrett | Aug. 6, 1946 |
| 2,601,912 | Reed | July 1, 1952 |
| 2,895,581 | Lysett | July 21, 1959 |